United States Patent [19]

Muranaka

[11] Patent Number: 4,568,949

[45] Date of Patent: Feb. 4, 1986

[54] THERMAL TRANSFER PRINTER WITH IMPROVED ADHESION OF COLORED MATERIAL SPOTS TO THE RECORD MEDIUM

[75] Inventor: Masakazu Muranaka, Tokyo, Japan

[73] Assignee: Ricoh Co., Ltd., Tokyo, Japan

[21] Appl. No.: 606,661

[22] Filed: May 3, 1984

[30] Foreign Application Priority Data

May 6, 1983 [JP] Japan ................................ 58-079718

[51] Int. Cl.⁴ ................................ G01D 15/10

[52] U.S. Cl. ................................ 346/76 PH; 400/120

[58] Field of Search ................................ 346/76 R, 76 PH; 400/120, 641, 662

[56] References Cited

U.S. PATENT DOCUMENTS 1,034,381 7/1912 Banta ................................ 400/641

4,447,818 5/1984 Kurata ................................ 346/76 PH 4,458,253 7/1984 Goff ................................ 346/76 PH

FOREIGN PATENT DOCUMENTS 5462982 1/1980 Japan ................................ 400/120

*Primary Examiner*—E. A. Goldberg
*Assistant Examiner*—Mark Reinhart
*Attorney, Agent, or Firm*—Cooper, Dunham, Clark, Griffin & Moran

[57] ABSTRACT

A thermal transfer printer including a printhead having a plurality of individually energizable thermal elements arranged in a primary scanning direction, wherein a carrier sheet bearing a plurality of different color record-forming materials arranged on discrete surface portions located in end-to-end relation in a subsidiary scanning direction and a record medium are pressed together and moved across the printhead in the subsidiary scanning direction in timed relation. The thermal elements are selectively energized to transfer spots of one color record-forming material after another from the carrier sheet to the record medium by repeatedly performing a thermal transfer printing operation. A heating roller and a pressing roller are brought into contact with the record medium after spots of one color record-forming material are transferred, to remove irregularities from the surface of the record medium before transferring thereto spots of another color. Minuscule irregularities may be formed on the surface of the pressing roller to form irregularities on the transferred spots to facilitate adhesion thereto of spots of another color.

8 Claims, 6 Drawing Figures

THERMAL TRANSFER PRINTER WITH IMPROVED ADHESION OF COLORED MATERIAL SPOTS TO THE RECORD MEDIUM

FIELD OF THE INVENTION

This invention relates to a thermal transfer printer for recording images on plain paper by transferring different color materials from a carrier sheet as the plain paper and carrier sheet are moved across a printhead while they are maintained in superposed relation.

DESCRIPTION OF THE PRIOR ART

Figure 1:
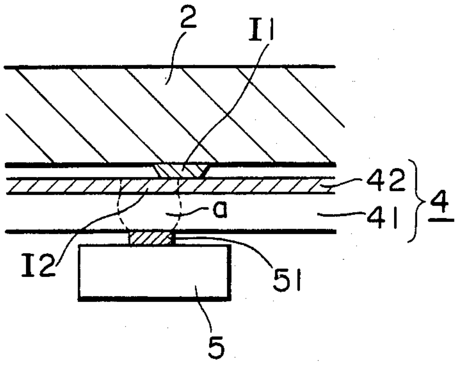
FIG. 1 (PRIOR ART)
FIGS. 1 and 2 show the manner in which a record medium and a carrier sheet are placed in superposed relation to record images on the record medium by thermal transfer printing in a thermal transfer printer of the prior art.

Generally, in a thermal transfer color printer, a carrier web and a record medium web are placed in superposed relation and moved across a printhead including a plurality of individually energizable thermal elements for one line of image information to be printed arranged in a primary scanning direction, to transfer different colored materials from the carrier web to the surface of the record medium web to record color images of information by thermal transfer printing. The carrier web includes a plurality of separate areas located in end-to-end relation on which different colored materials being meltable by heat are coated to provide areas of materials of primary colors for example yellow, magenta and cyan. The record medium which may be plain paper is superposed on the carrier web having one surface maintained in heat transfer relation with the printhead and they are pressed together between the printhead and a platen roller as they are moved across the printhead in a subsidiary scanning direction so that spots of different colored materials corresponding to one line of image information are formed successively in the same position on the record medium web as the plurality of individually energizable thermal elements are selectively energized in accordance with image information corresponding to one line. More specifically, each colored material layer of the carrier web has a record capacity of one page and image information is first recorded on the record medium web for one page by transfer printing from the colored material layer of yellow color. Then, the record medium web is reset so as to bring its leading end to the recording position to record image information for one page by transfer printing from the colored material layer of magenta color. Finally, after the record medium web is reset, image information for one page is recorded by transfer printing from the colored material layer of cyan color. The color images are formed for recording on the record medium web by a method of mixing the primary colors.

In this type of thermal transfer color printer, it has hitherto been usual practice to melt different colored materials of yellow, magenta and cyan and successively transfer spots of them from the carrier web to the record medium web by transfer printing while controlling the volumes of the colored materials, to obtain images of intermediate colors on the record medium web. No difficulties are experienced in transferring spots of the first colored medium to the record medium web from the carrier web. However, when spots of the second colored material are transferred and placed on the spots of the first colored material in superposed relation on the record medium web, the surface of the record medium web has irregularities thereon because of the presence of spots of the first colored material and transfer of the second colored material might be interfered with by the irregularities on the surface of the record medium web, making it impossible to perform transfer printing satisfactorily.

When spots of different colored materials are successively transferred from the carrier web to the record medium web and placed in superposed relation as described hereinabove, it has been usual practice to slightly displace spots of second colored material from corresponding spots of first colored material without bringing them to a condition of exact matching in position, so as to improve the tone of the intermediate colors. This is illustrated in FIG. 1 in which a spot 12 of the second colored material does not match a spot 11 of the first colored material exactly in position but they are slightly displaced from each other. It will be seen, however, that there are gaps between the carrier web 4 and record medium web 2 where the spots 11 and 12 of different colored materials do not match exactly. In these gaps, the force with which the record medium web 2 and carrier web 4 are pressed together between a platen roller and a printhead is reduced in magnitude, resulting in the transfer of spots of the second colored material being performed unsatisfactorily. This phenomenon markedly occurs when spots of the third colored material are printed by thermal transfer on the second colored material on the record medium web 2. In FIG. 1, the numeral 41 designates a base of the carrier web 4, and the numeral 42 designates a colored material layer formed on the base 41, while a designates a portion of the carrier web 4 which is heated by a thermal element 51 of the printhead 5.

Figure 2:
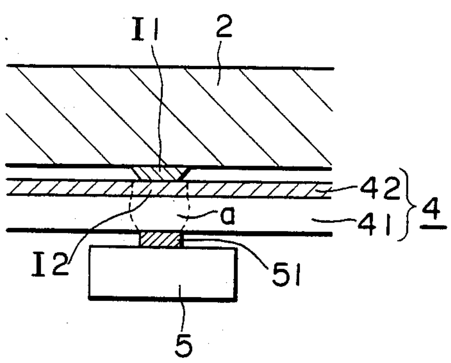
FIG. 2 (PRIOR ART)

When thermal transfer printing is performed in such a manner that, as shown in FIG. 2, the spot 12 of the second colored material and the spot 11 of the first colored material are brought to a condition of exact matching in position on the record medium web 2, another problem has been experienced. The surface of the spot 11 of the first colored material transferred to the surface of the record medium web 2 is smoother than the surface of the record medium web 2, resulting in the spot 12 of the second colored material placed in superposed relation to the spot 11 of the first colored material separating itself from the spot 11 because they do not adhere well to each other.

The problems described hereinabove which have been encountered in a thermal transfer color printer have not been confined to the multicolor printer but also experienced in a thermal transfer printer of a type in which the carrier web has two colored material areas of white and black so that not only recording of information may be made on the record medium in black color but also recording of information in intermediate colors may be made by transferring spots of a colored material of white to the record medium and placing same on spots of a colored material of black transferred to the record medium beforehand.

SUMMARY OF THE INVENTION

This invention has been developed for the purpose of obviating the aforesaid problems of the prior art. Accordingly, the invention has as its object the provision of a thermal transfer printer capable of recording images by thermal transfer printing in which colored materials are transferred well even when spots of different colored materials are transferred and superposed on the record medium.

To accomplish the aforesaid object, means is provided according to the invention for applying heat and pressure to the record medium to flatten the surface of the record medium each time spots of a colored material are transferred to the record medium after spots of another colored material have been transferred, to remove irregularities formed on the surface of the record medium by the spots of the previously transferred colored material.

According to the invention, means may be provided for producing minuscule irregularities on the surface of the record medium, particularly on the spots of transferred colored material, simultaneously with the removal of the removal of the spot irregularities on the surface of the record medium or after they are removed.

In the thermal transfer printer according to the invention, the spots of the different colored materials formed on the surface of the record medium adhere well to each other, to enable satisfactory recording of images by overlapping the spots of different colored materials to provide a high quality duplicate of a document.

DESCRIPTION OF THE PREFERRED EMBODIMENTS

Figure 3:
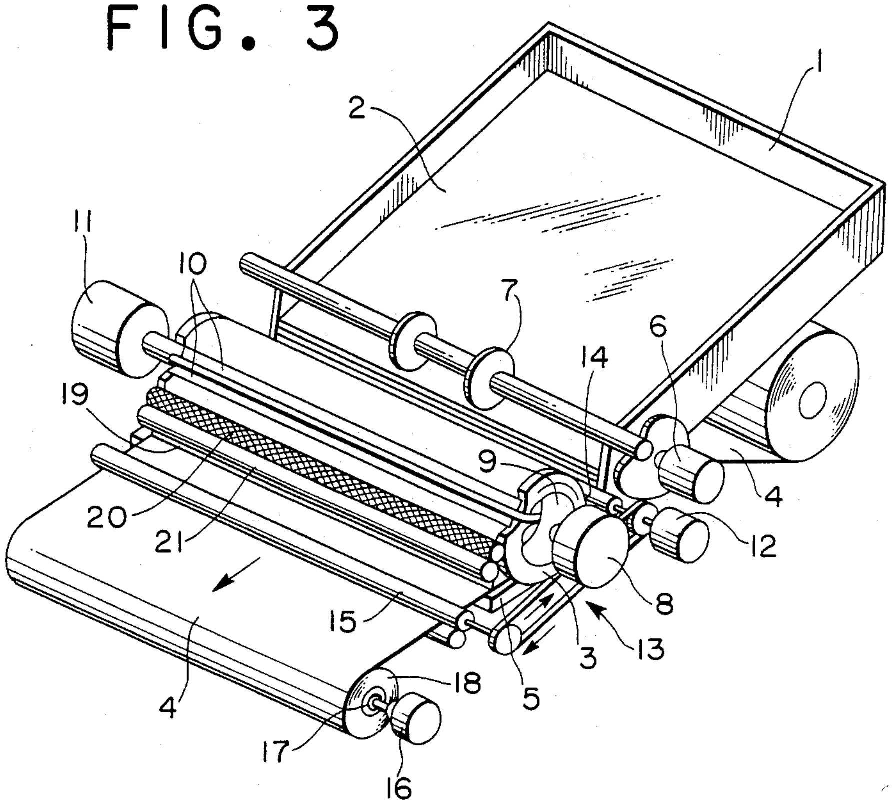
FIG. 3 shows the thermal transfer printer comprising one embodiment of the invention.

FIG. 3 shows one constructional from of the thermal transfer printer according to the invention, wherein a record medium feeding cassette 1 containing a record medium 2 of plain paper or the like feeds the record medium 2 which is set in position as it is wound on a platen 3 of a drum shape. Then, the platen 3 is rotated and a carrier web 4 having layers of different colored materials is payed out to allow the record medium 2 and the carrier web 4 to move across a printhead 5 of one line while they are pressed together between the printhead 5 and the platen 3, so that images can be recorded on the record medium 2 in accordance with information for line by successively transferring spots of different colored materials from the carrier web 4 to the record medium 2 by thermal transfer printing. When the thermal transfer printer is of a direct heating type, the printhead 5 may be a thermal head including recording medium formed of a heat generating meterial; When the thermal transfer printer is of an electrically heating type (wherein the carrier web 4 comprises a base in the form of a film which is rendered electrically conductive so that Joule heat can be utilized), the printhead 4 may be one which is provided with a needle-like electrode and a return electode. The record medium 2 is fed by means of a feeding roller 7 driven by an AC motor 6 and wound on the platen 3 where it is secured in place by locking claws 10 driven through a clutch 8 and a cam 9. The platen 3 is moved step by step for one line in one direction by a paper feed motor 11. The carrier web 4 is fed by feed rollers 14 and 15 driven by an ink sheet feed motor 12 and a belt pulley mechanism 13 in synchronism with the platen 3 while having a tension imparted thereto by a spring mechanism 12 driven by an AC motor 16, so that the carrier web 4 may be wound on a take-up roller in a taught condition. In the figure, the numeral 19 designates separation claws for stripping the carrier web 4 off the record medium 2 after recording of images on the record medium 2 is performed by thermal transfer of different colored materials from the carrier web 4.

In this type of thermal transfer printer, recording of images by thermal transfer of different colored materials is performed as follows. When recording of multiple color images is performed, the carrier web 4 is fed to a recording station while synchronizing the carrier web feeding with the rotation of the platen 3 to position the record medium 2 with the leading end of each of the areas of different colored materials on the surface of the carrier web 4. Thus, recording of images in yellow color is performed when the platen 3 is rotated for the first time, and recording of images in magenta and cyan colors is performed when the platen 3 is rotated for the second and third times respectively so that spots of different difent colored materials are successively formed on the record medium 2 on the same page in accordance with image information, to thereby effect recording of the images in color on the record medium 2.

In the thermal transfer printer of the aforesaid construction and operation, the invention provides, as shown in FIG. 3, a heating roller 21 maintained in contact with a pressing roller 20, which heats the record medium 2 wound on the platen 3 after thermal transfer printing is performed to a temperature below the melting point of the each colored material and above the softening point thereof. The record medium 2 thus heated by the heating roller 21 is pressed against the pressing roller 20 by a spring, not shown, or other suitable means by a predetermined force to remove irregularities from the surface of the record medium 2 to which spots of different colored materials have been transferred.

Figure 4:
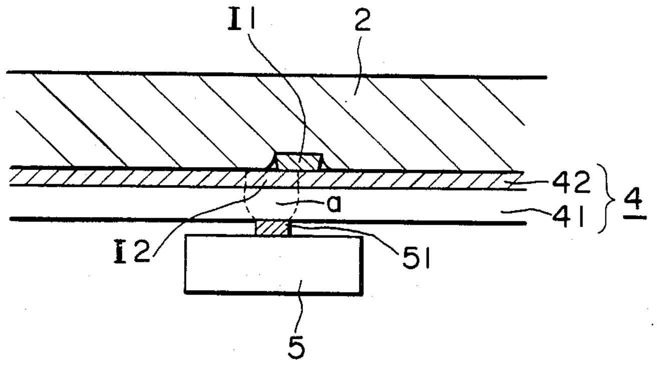
FIG. 4 shows the manner in which a record medium and a carrier sheet are placed in superposed relation to record images on the record medium by thermal transfer printing in the thermal transfer printer shown in FIG. 3.

The effects achieved by the provision of the aforesaid means for removing irregularities from the surface of the record medium 2 after spots of different colored materials have been transferred thereto from the carrier web 4 are shown in FIG. 4. In the figure, the spot 11 of the first colored material transferred from the carrier web 4 to the surface of the record medium 2 has a surface which is flush with the surface of the record medium 2. Thus, when the spot 12 of the second colored material is transferred from the carrier web 4 and superposed on the spot 11 of the first colored material on the surface of the record medium 2 in slightly displaced relation, no gap is formed between the surface of the carrier web 4 and the surface of the record medium 2, so that uniform pressure can be applied to the entire surfaces of the record medium 2 and carrier web 4 in the recording position between the platen 3 and printhead 5 while they are held in superposed relation to perform thermal transfer printing. The same effects can be achieved when a spot of the third colored material is superposed on the spot 12 of the second colored material by thermal transfer printing, so that a spot of the third colored material can be deposited on the spot of the second colored material without forming a gap between the surface of the record medium 2 and the surface of the carrier web 4 because the surface of the spot of the third colored material is rendered flush with the surface of the record medium 2 by the combined action of the heating roller 21 and the pressing roller 20.

Figure 5:
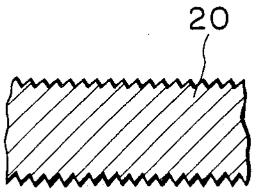
FIG. 5 is a fragmentary vertical sectional view of the pressing roller.

In the present invention, the surface of the pressing roller 20 is formed with a multiplicity of minuscule irregularities so as to form irregularities on the spots of a colored material transferred to the surface of the record medium 2 from the carrier web 4 when pressure is applied by the pressing roller 20 to the surface of the record medium 2 on which the spots of the colored material have already been formed by transfer printing. FIG. 5 shows in a fragmentary vertical sectional view the pressing roller 20. The irregularities formed on the surface of the pressing roller 20 are so fine that their spacing interval is very small as compared with the dot diameter of the colored materials (about 1/5, for example).

Figure 6:
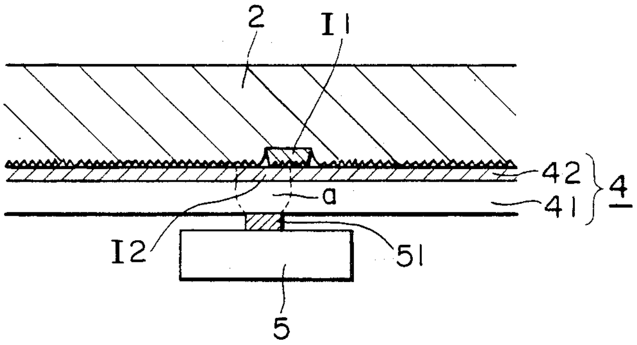
FIG. 6 shows the manner in which a record medium and a carrier sheet are placed in a superposed relation to record images on the record medium by thermal transfer printing in another embodiment of the thermal transfer printer in conformity with the invention.

The provision of the aforesaid means for forming minuscule irregularities on the spots of the colored material formed on the surface of the record medium 2 enables, as illustrated in FIG. 6, the spot 12 of a colored material formed on the spot 11 of a colored material formed previously on the surface of the record medium 2 and having minuscule irregularities formed thereon by the action of the pressing roller 20 to adhere better to the spot 11.

The invention is not limited to the type of thermal transfer printer shown in FIG. 3, and can have application in a type of thermal transfer printer in which a record medium is repeatedly fed to the printing station and returned to the original position to perform recording of images by thermal transfer printing. Also, the means for pressing the record web against the heating roller after spots of a colored material are formed thereon and means for forming minuscule irregularities on the spots of the colored material formed on the surface of the record web may be separately provided as desired.

From the foregoing description, it will be appreciated that in the thermal transfer printer according to the invention, means is provided for heating a record web after transfer of spots of one colored material is performed to remove irregularities from the surface of the record medium, and means is provided, when necessary, to form minuscule irregularities on the surface of the spots of the colored material formed by transfer printing on the surface of the record medium. By virtue of these features, the invention enables recording of images by thermal transfer printing to be performed satisfactorily to provide multicolor images recorded on the record medium by thermal transfer printing without the disadvantage of producing multiple color images of poor quality formed by thermal transfer printing while a record medium and a carrier web are kept in superposed relation.

What is claimed is:

1. A thermal transfer printing apparatus comprising:

a stationary printhead having a plurality of individually energizable thermal elements corresponding to one line of information to be recorded arranged in a primary scanning direction;

a carrier sheet supported for movement across said printhead in a direction substantially perpendicular to said primary scanning direction or in a subsidiary scanning direction with one face of the sheet being maintained in heat transfer relation with the thermal elements, said sheet bearing a plurality of different color record-forming materials arranged in a plurality of separate areas located in end-to-end relation in said subsidiary scanning direction;

means for feeding and supporting a record medium on the opposite surface of said carrier sheet for movement in the subsidiary scanning direction;

means for driving said carrier sheet and record medium for movement across said printhead in timed relation while pressing them together so as to perform recording of the information of one line on the record medium in different colors by successively transferring spots of the color record-forming materials from the carrier sheet onto the record medium as the thermal elements are selectively energized; and means for pressing, into the record medium, spots of one of the color record-forming materials after thermal transfer thereof from the carrier sheet to the record medium but before thermal transfer of spots of another color from the carrier sheet to the record medium, to thereby reduce surface irregularities of the record medium before the last-recited thermal transfer;

wherein the means for pressing includes means for forming miniscule irregularities in the surface of the spots being pressed into the record medium, said miniscule irregularities being small in size as compared with the size of the spots, to thereby improve adhesion to the spots pressed into the record medium of spots subsequently transferred from the carrier sheet to the record medium.

2. A thermal transfer printing apparatus as claimed in claim 1, wherein said means for pressing comprises a heating roller brought into contact with the surface of the record medium after spots of a color record-forming material are transferred from the carrier sheet to the record medium, and a pressing roller for forcing said heating roller against said record medium, said heating roller heating the surface of the record medium to a temperature above the softening point of the spots of color record-forming material and below the melting point thereof.

3. A thermal transfer printing apparatus as claimed in claim 1, wherein said means for forming minuscule irregularities in the surface of the spots comprises minuscule irregularities formed in the surface of said pressing roller.

4. A thermal transfer printing apparatus as claimed in claim 1, wherein said plurality of different color record-forming materials comprises materials of primary colors.

5. A thermal transfer printing apparatus as claimed in claim 1, wherein said plurality of different color record-forming materials comprises materials capable of transferring to the record medium by melting upon being heated.

6. A thermal transfer printing apparatus as claimed in claim 1, wherein said carrier sheet is configured as a web.

7. A thermal transfer printing apparatus as claimed in claim 1, wherein said record medium is plain paper.

8. A thermal transfer printing apparatus as claimed in claim 1 in which the size of the miniscule irregularities is about 1/5 that of the spots.

* * * * *